US011365307B2

(12) United States Patent
Hildebrandt et al.

(10) Patent No.: US 11,365,307 B2
(45) Date of Patent: Jun. 21, 2022

(54) POLYETHYLENE COMPOSITION

(71) Applicant: SABIC GLOBAL TECHNOLOGIES B.V., Bergen op Zoom (NL)

(72) Inventors: Haika Johanna Hildebrandt, Geleen (NL); Sarah Van Mierloo, Geleen (NL); Rainer Heinrich Kloth, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 213 days.

(21) Appl. No.: 16/623,666

(22) PCT Filed: Jul. 3, 2018

(86) PCT No.: PCT/EP2018/067927
§ 371 (c)(1),
(2) Date: Dec. 17, 2019

(87) PCT Pub. No.: WO2019/007946
PCT Pub. Date: Jan. 10, 2019

(65) Prior Publication Data
US 2020/0172708 A1     Jun. 4, 2020

(30) Foreign Application Priority Data

Jul. 7, 2017     (EP) ..................... 17180178

(51) Int. Cl.
| | |
|---|---|
| C08K 13/02 | (2006.01) |
| C08K 5/00 | (2006.01) |
| C08K 5/23 | (2006.01) |
| C08K 3/014 | (2018.01) |
| C08L 23/04 | (2006.01) |
| C08L 23/06 | (2006.01) |
| C08K 5/101 | (2006.01) |
| C08K 5/5333 | (2006.01) |
| C08K 5/5313 | (2006.01) |

(52) U.S. Cl.
CPC .............. C08K 13/02 (2013.01); C08K 3/014 (2018.01); C08K 5/005 (2013.01); C08K 5/23 (2013.01); C08L 23/04 (2013.01); C08L 23/06 (2013.01); C08K 5/101 (2013.01); C08K 5/5313 (2013.01); C08K 5/5333 (2013.01); C08K 2201/014 (2013.01)

(58) Field of Classification Search
CPC .......... C08K 13/02; C08K 3/014; C08K 3/30; C08K 2003/3036; C08K 5/005; C08K 5/13; C08K 5/523; C08K 5/524; C08K 5/101; C08K 5/5313; C08K 5/5317; C08K 5/5333; C08K 2201/014; C08L 23/04; C08L 23/06
See application file for complete search history.

(56) References Cited

U.S. PATENT DOCUMENTS

| | | | | |
|---|---|---|---|---|
| 4,829,110 A | * | 5/1989 | Van Asbroeck | ....... C08K 13/02 524/81 |
| 6,136,926 A | * | 10/2000 | Raetzsch | ............... C08F 255/00 525/254 |
| 6,780,905 B2 | * | 8/2004 | Bienmuller | .............. C08K 3/30 524/100 |
| 2003/0149180 A1 | * | 8/2003 | Van Dun | ............... C08F 210/16 525/240 |
| 2006/0211794 A1 | * | 9/2006 | Krohnke | .............. C08K 5/0041 524/99 |
| 2012/0118390 A1 | * | 5/2012 | Piel | ..................... C08L 23/0815 137/1 |
| 2013/0122226 A1 | | 5/2013 | Lanier et al. | |
| 2013/0197136 A1 | * | 8/2013 | Hagstrand | ............. C08K 5/527 524/110 |
| 2015/0090671 A1 | * | 4/2015 | Hjertberg | ................. C02F 1/76 210/754 |

FOREIGN PATENT DOCUMENTS

| | | | | |
|---|---|---|---|---|
| EP | 2361951 A1 | | 8/2011 | |
| WO | WO 9919397 A1 | * | 4/1999 | ............. C08K 13/02 |
| WO | WO 2011101091 A1 | * | 8/2011 | ............. C08L 23/12 |
| WO | 2017021124 A1 | | 2/2017 | |

OTHER PUBLICATIONS

Alt et al., "Bimodal Polyethylene—Interplay of Catalyst and Process," Macromol. Symp. 2001, vol. 163, pp. 135-143.
Gijsman; "Review on the thermo-oxidative degradation of polymers"; e-Polymers, No. 065; 2008, pp. 1-34.
Gordienko et al.; "Structure and physicomechanical properties of linear polyethylene containing a ZnO—ZnS mixture under UV irradiation"; International Polymer Science and Technology, vol. 35; 2008, p. T27-T31.
Hare; "The Degradation of Coatings by Ultraviolet Light and Electromagnetic Radiation"; Journal of Protective Coatings & Linings, 1992.
International Search Report for International Application PCT/EP2018/067927, International Filing Date Jul. 3, 2018, dated Sep. 28, 2018, 5 pages.
PE 100 Pipe Systems, second edition, Heiner Bromstrup (editor), 2004, pp. 16-20 ISBN 3-8027-2728-2.
Tolinski; "Additives for Polyolefins: Getting the Most out of Polypropylene, Polyethylene and TPO"; Elsevier Inc., 2nd Ed.; 2015; pp. 19-31.
Written Opinion for International Application PCT/EP2018/067927, International Filing Date Jul. 3, 2018, dated Sep. 28, 2018, 6 pages.

* cited by examiner

*Primary Examiner* — Jane L Stanley
(74) *Attorney, Agent, or Firm* — Cantor Colburn LLP

(57) ABSTRACT

The invention relates a polymer composition comprising polyethylene and a stabiliser package comprising: a) a phenolic stabiliser or mixtures thereof, b) an organic phosphite and/or phosphonite or mixtures thereof, c) zinc sulphide, and d) an acid scavenger. The polymer composition can be applied in the production of articles which are used in applications where a high temperature resistance is needed.

19 Claims, No Drawings

POLYETHYLENE COMPOSITION

CROSS REFERENCE TO RELATED APPLICATIONS

This application is a 371 of International Application No. PCT/EP2018/067927, filed Jul. 3, 2018, which is incorporated by reference in its entirety, and which claims priority to European Application Serial No. 17180178.0 filed Jul. 7, 2017.

BACKGROUND

The present invention relates to a polyethylene composition. The invention also relates to the use of this composition in the production of articles.

It is well known that polyethylene is prone to thermo-oxidative degradation as for example disclosed by Michael Tolinski in "Additives for Polyolefins: Getting the Most out of Polypropylene, Polyethylene and TPO", 2015, Elsevier Inc., 2nd Ed., pages 19-31 and by Pieter Gijsman in "Review on the thermo-oxidative degradation of polymers", e-Polymers, 2008, no. 065.

To improve the material's durability and to protect it against thermo-oxidative degradation during both production and service life of the article, the material is stabilised by an additive package. Frequently used additive packages comprise for example primary antioxidants such as hindered phenols and secondary antioxidants such as organic phosphites as for example disclosed by Cornelia Versile in "Handbook of Polyolefins", 2nd Ed., 2000, Dekker, page 517-523.

WO 2017021124 relates to a pipe for drinking water distribution with improved resistance to chlorinated disinfectants characterised in that the pipe is produced with a polymer composition comprising a polyolefin and a bisphenol monoester.

US 2013122226 describes a method comprising forming a polymeric composition by adding zinc oxide to a polymer wherein a pipe formed from the polymeric composition displays a time to failure as determined in accordance with ASTM F2263-07(EI) that is increased when compared to an otherwise similar pipe formed from a polymeric composition lacking zinc oxide. A pipe comprising polyethylene and greater than about 0.5 wt. % zinc oxide having a time to failure as determined in accordance with ASTM F2263-07 (EI) that is at least about 25% greater than an otherwise similar pipe prepared in the absence of zinc oxide.

EP 2361951 deals with a polypropylene composition comprising a base resin consisting of at least one propylene homo- or copolymer, an acid scavenger and a pigment.

In many applications polyethylene articles are exposed to severe environmental conditions. Often they are in contact with liquid and/or gaseous media. In addition, the articles are exposed to elevated temperatures. Both factors cause severe degradation of the material, resulting in changes in chemical, physical, mechanical and esthetical properties.

It is therefore necessary to design the polyolefin composition in such a way that it has an adequate chemical resistance against the aforementioned conditions. In particular, it is desirable to be able to use the polyolefin composition for articles that need to exhibit enhanced mechanical properties, for example resistance against creep and slow crack growth, and at the same time exhibit a long lifetime at severe environmental conditions. That may be constant elevated temperatures between 40-60° C. or temperature peaks up to 80° C. Such properties are of importance for a large range of applications. Typical examples are large diameter pressure pipes in power plants, hot fluid transport and geo-thermal applications. Next to that, heat exchangers, power cable conduits, undersea cables, tanks and geo-membranes constitute possible application fields.

It is the object of the present invention to provide a polyethylene composition with enhanced mechanical properties at elevated temperatures to be used in the production of articles for industrial applications, where improved long service life and thermo-oxidative stabilization performance are required.

Zinc sulphide is known for a long time as whitening pigment and UV stabilizer as described for example by John Murphy in "Additives for Plastics Handbook", Elsevier, $2^{nd}$ Edition, 2001, page 78-79 and by V. P. Gordienko et al. in "Structure and physicomechanical properties of linear polyethylene containing a ZnO—ZnS mixture under UV irradiation", International Polymer Science and Technology, 35, 2008, page T27-T31 and in Bal JJ. "Selection of colorants and other additives for durable products", ANTEC 2007, conference proceedings. Society of Plastics Engineers; 2007. The well-accepted mechanism of UV protection relies on the fact that zinc sulphide absorbs the UV light and thereby prevents the interaction of UV light with the polymer as disclosed by Clive Hare in "The Degradation of Coatings by Ultraviolet Light and Electromagnetic Radiation" Journal of Protective Coatings & Linings, 1992.

SUMMARY

It has now been found that polyethylene compositions comprising low amounts of zinc sulphide in combination with phenolic stabilisers show a synergistic effect. This results in enhanced mechanical properties of the polyethylene composition at elevated temperatures and makes the polyethylene composition suitable to be used in the production of articles for industrial applications, where improved long service life and thermo-oxidative stabilization performance are required.

The invention is characterised in that the polyethylene composition comprises polyethylene and a stabiliser package comprising
  a) a phenolic stabiliser or mixtures thereof
  b) an organic phosphite and/or phosphonite or mixtures thereof
  c) zinc sulphide and
  d) an acid scavenger.

DETAILED DESCRIPTION

The invention may for example be characterised in that the polyethylene composition consists of polyethylene, carbon black in the range 0 wt % and ≤3.0 wt % and a stabiliser package consisting of
  a) a phenolic stabiliser or mixtures thereof
  b) an organic phosphite and/or phosphonite or mixtures thereof
  c) zinc sulphide and
  d) an acid scavenger.

Preferably, the polyethylene is multimodal polyethylene for example bimodal or trimodal polyethylene. More preferably, the polyethylene is bimodal polyethylene.

The multimodal polyethylene may be an ethylene homo- or copolymer. The comonomer may be for example butene or hexene.

According to a preferred embodiment of the invention the polyethylene is a multimodal high density polyethylene (HDPE) having a polymer density ≥940 and ≤965 kg/m³ and a melt flow rate MFR190/5 in the range ≥0.1 and ≤4.0 g/10 min. More preferably, the density is ≥945 and ≤955 kg/m³ and the melt flow rate MFR190/5 in the range ≥0.1 and ≤0.6 g/10 min. The density is measured according to ISO 1183 A. The melt flow rate MFR 190/5 is measured according to ISO 1133-1(190° C.; 5.0 kg). The HDPE may for example be natural or colored.

According to a preferred embodiment of the invention the polyethylene is a compound comprising multimodal high density polyethylene and carbon black as pigment, wherein the density of the compound is in the range ≥950 and ≤970 kg/m³ and the melt flow rate MFR190/5 in the range ≥0.1 and ≤4.0 g/10 min, wherein the density is measured according to ISO 1183 A and the melt flow rate MFR 190/5 is measured according to ISO 1133-1(190° C.; 5.0 kg). More preferably, the density is >956 and ≤965 kg/m³ and the melt flow rate MFR190/5 is ≥0.1 and ≤0.6 g/10 min. Typically, compositions such as used for black HDPE pressure pipes contain a carbon black content in the range ≥1.5 wt % and ≤3.0 wt % relative to the total amount of the composition.

The production processes for bimodal high density polyethylene (HDPE) are summarised at pages 16-20 of "PE 100 Pipe systems" (edited by Bromstrup; second edition, ISBN 3-8027-2728-2). The production of bimodal high density polyethylene (HDPE) via a low pressure slurry process is described by Alt et al. in "Bimodal polyethylene-Interplay of catalyst and process" (Macromol. Symp. 2001, 163, 135-143). Bimodal high density polyethylene may be produced via a low pressure slurry process comprising a polymerisation stage, a powder drying stage, an extrusion and pellet handling stage, a recycling stage and a wax removal unit. In a two stage cascade process the reactors may be fed continuously with a mixture of monomers, hydrogen, catalyst/co-catalyst and diluent recycled from the process. In the reactors, polymerisation of ethylene occurs as an exothermic reaction at pressures in the range between for example 0.5 MPa (5 bar) and 1 MPa (10 bar) and at temperatures in the range between for example 75° C. and 88° C. The heat from the polymerisation reaction is removed by means of cooling water. The characteristics of the polyethylene are determined amongst others by the catalyst system and by the concentrations of catalyst, comonomer and hydrogen. The production of bimodal high density polyethylene (HDPE) via a low pressure slurry process may also be performed via a three stage process.

The concept of the two stage cascade process is elucidated at pages 137-138 by Alt et al. "Bimodal polyethylene-Interplay of catalyst and process" (Macromol. Symp. 2001, 163). The reactors are set up in cascade with different conditions in each reactor including low hydrogen content in the second reactor. This allows for the production of HDPE with a bimodal molecular mass distribution and defined co monomer content in the polyethylene chains.

Suitable catalysts for the production of multimodal polyethylene include Ziegler Natta catalysts, chromium based catalysts and single site metallocene catalysts. In all potential possible technologies the process and the catalyst have to form a well-balanced system. The catalyst is crucial for the polymerisation reaction of multimodal polyethylene. By cooperation of process and catalyst a definite polymer structure is produced.

According to a preferred embodiment of the invention, HDPE without pigments or HDPE with pigments, for example carbon black, has the following characteristics:

Tensile modulus between ≥500 and ≤1400 MPa (according to ISO 527-2)
Yield stress between ≥18 and ≤32 MPa (according to ISO 527-2)
Full Notch Creep Test (FNCT): 100-20000 h (according to ISO 16770 @80° C./4 MPa)
Charpy impact strength between ≥14 and ≤35 kJ/m² @23° C. (according to ISO 179-1eU).

According to a further preferred embodiment of the invention HDPE or HDPE with pigments, for example carbon black, has the following characteristics:

Tensile modulus between ≥900 and ≤1400 MPa (according to ISO 527-2)
Yield stress between ≥22 and ≤32 MPa (according to ISO 527-2)
Full Notch Creep Test (FNCT): 1000-20000 h (according to ISO 16770 @ 80° C./4 MPa)
Charpy between ≥17 and ≤35 kJ/m²@23° C. (according to ISO 179-1eU).

Preferably the amount of polyethylene in the composition is ≥95.0 wt % and ≤99.5 wt % relative to the total amount of polyethylene and stabiliser package comprising components a)-d).

According to a preferred embodiment of the invention the amount of polyethylene in the composition is ≥96.0 wt % and ≤99.5 wt % relative to the total amount of polyethylene and stabiliser package comprising components a)-d).

According to a more preferred embodiment of the invention the amount of polyethylene in the composition is ≥98.0 wt % and ≤99.5 wt % relative to the total amount of polyethylene and stabiliser package comprising components a)-d).

Preferably the total amount of stabiliser package in the composition is ≥0.5 wt % and ≤5.0 wt % relative to the total amount of polyethylene and stabiliser package comprising components a)-d).

According to a preferred embodiment of the invention the total amount of stabiliser package in the composition is ≥0.7 wt % and ≤3.0 wt % relative to the total amount of polyethylene and stabiliser package comprising components a)-d).

According to a preferred embodiment of the invention the total amount of stabiliser package in the composition is ≥0.7 wt % and ≤1.5 wt % relative to the total amount of polyethylene and stabiliser package comprising components a)-d).

The amount of the phenolic stabiliser or mixtures of phenolic stabilisers in the composition is ≥0.1 wt % and ≤1.0 wt % relative to the total amount of polyethylene and stabiliser package comprising components a)-d).

Preferably, the amount of the phenolic stabiliser or mixtures of phenolic stabilisers in the composition is ≥0.25 wt % and ≤0.50 wt % relative to the total amount of polyethylene and stabiliser package comprising components a)-d).

The amount of organic phosphite and/or phosphonite or mixtures thereof in the composition is ≥0.1 wt % and ≤1.0 wt % relative to the total amount of polyethylene and stabiliser package comprising components a)-d).

Preferably, the amount of organic phosphite and/or phosphonate or mixtures thereof in the composition is ≥0.1 wt % and ≤0.2 wt % relative to the total amount of polyethylene and stabiliser package comprising components a)-d).

The amount of zinc sulphide in the composition is ≥0.01 wt % and ≤3.0 wt % relative to the total amount of polyethylene and stabiliser package comprising components a)-d).

Preferably, The amount of zinc sulphide in the composition is ≥0.01 wt % and ≤1.0 wt % relative to the total amount of polyethylene and stabiliser package comprising components a)-d).

More preferably, the amount of zinc sulphide in the composition is ≥0.01 wt % and ≤0.1 wt % relative to the total amount of polyethylene and stabiliser package comprising components a)-d).

More preferably, the amount of zinc sulphide in the composition is ≥0.01 wt % and ≤0.05 wt % relative to the total amount of polyethylene and stabiliser package comprising components a)-d).

The amount of acid scavenger or mixtures thereof in the composition is ≥0.1 wt % and ≤0.3 wt % relative to the total amount of polyethylene and stabiliser package comprising components a)-d).

According to a preferred embodiment the polyethylene composition comprises polyethylene and a stabiliser package comprising or consisting of
- a) ≥0.1 wt % and ≤1.0 wt % of a phenolic stabiliser or mixtures thereof relative to the total amount of polyethylene and stabiliser package comprising components a)-d).
- b) ≥0.1 wt % and ≤1.0 wt % of an organic phosphite and/or phosphonite or mixtures thereof relative to the total amount of polyethylene and stabiliser package comprising components a)-d).
- c) ≥0.01 wt % and ≤1.0 wt % of zinc sulphide relative to the total amount of polyethylene and stabiliser package comprising components a)-d) and
- d) ≥0.1 wt % and ≤1.0 wt % of an acid scavenger or mixtures thereof relative to the total amount of polyethylene and stabiliser package comprising components a)-d).

According to a further preferred embodiment, the polyethylene composition comprises bimodal polyethylene and a stabiliser package comprising or consisting of
- a) ≥0.1 wt % and ≤0.6 wt % of a phenolic stabiliser or mixtures thereof relative to the total amount of polyethylene and stabiliser package comprising components a)-d),
- b) ≥0.1 wt % and ≤0.3 wt % of an organic phosphite and/or a phosphonite or mixtures thereof relative to the total amount of polyethylene and stabiliser package comprising components a)-d),
- c) ≥0.01 wt % and ≤0.09 wt % zinc sulphide relative to the total amount of polyethylene and stabiliser package comprising components a)-d) and
- d) ≥0.1 wt % and ≤0.3 wt % of an acid scavenger or mixtures thereof relative to the total amount of polyethylene and stabiliser package comprising components a)-d).

According to a further preferred embodiment, the polyethylene composition comprises bimodal polyethylene and a stabiliser package comprising or consisting of
- a) ≥0.4 wt % and ≤0.6 wt % of a phenolic stabilizer or mixtures thereof relative to the total amount of polyethylene and stabiliser package comprising components a)-d),
- b) ≥0.1 wt % and ≤0.2 wt % of an organic phosphite and/or a phosphonite or mixtures thereof relative to the total amount of polyethylene and stabiliser package comprising components a)-d),
- c) ≥0.01 wt % and ≤0.05 wt % zinc sulphide relative to the total amount of polyethylene and stabiliser package comprising components a)-d) and
- d) ≥0.1 wt % and ≤0.3 wt % an acid scavenger or mixtures thereof relative to the total amount of polyethylene and stabiliser package comprising components a)-d).

Examples of suitable phenolic stabilisers include monophenolic, biphenolic and polyphenolic stabilisers. Examples of suitable phenolic stabilisers include tetrakis[methylene-3-(3',5'-di-t-butyl-4-hydroxyphenyl)propionate] methane, 1,1,3-tris(2-methyl-4-hydroxy-5-t-butylphenyl)butane; 1,3,5-trimethyl-2,4,6-tris(3,5-di-t-butyl-4-hydroxybenzyl)benzene, bis(3,3-bis(4'-hydroxy-3'-t-butylphenyl)butanoic acid]-glycol ester; tris(3,5-di-t-butyl-4-hydroxy benzyl)isocyanurate; 1,3,5-tris(4-t-butyl-2,6-dimethyl-3-hydroxy-benzyl)isocyanurate, 3,5-di-t-butyl-4-hydroxy-hydrocinnamic acid triester of 1,3,5-tris(2-hydroxyethyl)-s-triazine-2,4,6 (1H, 3H, 5H)-trione; p-cresol/dicyclopentadiene butylated reaction product and/or 2,6-bis(2'-bis-hydroxy-3'-t-butyl-5'-methyl-phenyl-4-methyl-phenol and mixtures thereof.

According to a preferred embodiment of the invention the phenolic stabiliser is selected from 1,3,5-trimethyl-2,4,6-tris (3,5-di-t-butyl-4-hydroxybenzyl)benzene (for example Irganox 1330 supplied by BASF) and/or tetrakis[methylene-3-(3',5'-di-t-butyl-4-hydroxyphenyl)propionate] methane (for example Irganox 1010 supplied by BASF).

Examples of suitable organic phosphites and phosphonites include triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphate, bis(2,6-di-tert-butyl-4-methylphenyl) pentaerythritol diphosphate, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin and/or bis(2,4-di-tert-butyl-6-methylphenyl) methyl phosphite, bis(2,4-di-tert-butyl-6-methylphenyl) ethyl phosphite and mixtures thereof.

According to a preferred embodiment of the invention the phosphite is tris(2,4-di-tert-butylphenyl) phosphite (for example Irgafos 168 supplied by BASF).

Suitable examples of acid scavengers include organic and inorganic scavengers.

Suitable examples of acid scavengers include metal stearates for example calcium stearate or magnesium stearate; hydrotalcite for example DHT4a; calcium lactate. According to a preferred embodiment of the invention the acid scavenger is calcium stearate.

According to a further preferred embodiment of the invention the polyethylene composition comprises polyethylene and a stabiliser package comprising:
- a) the phenolic stabilisers tetrakis[methylene-3-(3',5'-di-t-butyl-4-hydroxyphenyl)propionate] methane and 1,3,5-trimethyl-2,4,6-tris(3,5-di-t-butyl-4-hydroxybenzyl)benzene
- b) the organic phoshpite tris(2,4-di-tert-butylphenyl) phosphite
- c) zinc sulphide and
- d) the acid scavenger calcium stearate.

The amount of tetrakis[methylene-3-(3',5'-di-t-butyl-4-hydroxyphenyl)propionate] methane is preferably ≥0.1 wt % and ≤0.5 wt % relative to the total amount of polyethylene and stabiliser package comprising components a)-d).

Further preferred, the amount of tetrakis[methylene-3-(3', 5'-di-t-butyl-4-hydroxyphenyl)propionate] methane is ≥0.1 wt % and ≤0.2 wt % relative to the total amount of polyethylene and stabiliser package comprising components a)-d).

The amount of 1,3,5-trimethyl-2,4,6-tris(3,5-di-t-butyl-4-hydroxybenzyl)benzene is preferably ≥0.1 wt % and ≤0.5 wt % relative to the total amount of polyethylene and stabiliser package comprising components a)-d).

The amount of 1,3,5-trimethyl-2,4,6-tris(3,5-di-t-butyl-4-hydroxybenzyl)benzene ≥0.2 wt % and ≤0.4 wt % relative to the total amount of polyethylene and stabiliser package comprising components a)-d).

The amount of tris(2,4-di-tert-butylphenyl) phosphite is preferably ≥0.1 wt % and ≤0.3 wt % relative to the total amount of polyethylene and stabiliser package comprising components a)-d).

The amount of tris(2,4-di-tert-butylphenyl) phosphite is ≥0.12 wt % and ≤0.16 wt % relative to the total amount of polyethylene and stabiliser package comprising components a)-d).

The amount of zinc sulphide is preferably ≥0.03 wt % and ≤1.0 wt % relative to the total amount of polyethylene and stabiliser package comprising components a)-d).

More preferably this amount is ≥0.03 wt % and ≤0.08 wt % relative to the total amount of polyethylene and stabiliser package comprising components a)-d).

Most preferably this amount is ≥0.03 wt % and ≤0.05 wt % relative to the total amount of polyethylene and stabiliser package comprising components a)-d).

The amount of calcium stearate ≥0.1 wt % and ≤3.0 wt % relative to the total amount of polyethylene and stabiliser package comprising components a)-d).

The amount of calcium stearate is ≥0.16 wt % and ≤0.24 wt % relative to the total amount of polyethylene and stabiliser package comprising components a)-d).

According to a more preferred embodiment of the invention the polyethylene composition comprises polyethylene and a stabiliser package comprising:

a) ≥0.1 wt % and ≤0.5 wt % of tetrakis[methylene-3-(3', 5'-di-t-butyl-4-hydroxyphenyl)propionate] methane relative to the total amount of polyethylene and stabiliser package comprising components a)-d) and 0.1 wt % and ≤0.5 wt % of 1,3,5-trimethyl-2,4,6-tris(3,5-di-t-butyl-4-hydroxybenzyl)benzene relative to the total amount of polyethylene and stabiliser package comprising components a)-d)

b) ≥0.1 wt % and ≤0.3 wt % tris(2,4-di-tert-butylphenyl) phosphite relative to the total amount of polyethylene and stabiliser package comprising components a)-d)

c) ≥0.005 wt % and ≤0.3 wt % zinc sulphide relative to the total amount of polyethylene and stabiliser package comprising components a)-d)

d) ≥0.12 wt % and ≤0.5 wt % calcium stearate relative to the total amount of polyethylene and stabiliser package comprising components a)-d)

According to a more preferred embodiment of the invention the polyethylene composition comprises bimodal or multimodal high density polyethylene with a density in the range ≥940 and ≤970 kg/m³, which may for example be natural or coloured and a melt flow rate MFR190/5 in the range 0.1 and 4.0 g/10 min and a stabiliser package comprising:

a) ≥0.1 wt % and ≤0.3 wt % of tetrakis[methylene-3-(3', 5'-di-t-butyl-4-hydroxphenyl)propionate] methane relative to the total amount of polyethylene and stabiliser package comprising components a)-d) and ≥0.2 wt % and ≤0.5 wt % of 1,3,5-trimethyl-2,4,6-tris(3,5-di-t-butyl-4-hydroxybenzyl)benzene relative to the total amount of polyethylene and stabiliser package comprising components a)-d)

b) ≥0.1 wt % and ≤0.2 wt % tris(2,4-di-tert-butylphenyl) phosphite relative to the total amount of polyethylene and stabiliser package comprising components a)-d)

c) ≥0.01 wt % and ≤0.15 wt % zinc sulphide relative to the total amount of polyethylene and stabiliser package comprising components a)-d)

d) ≥0.12 wt % and ≤0.4 wt % calcium stearate relative to the total amount of polyethylene and stabiliser package comprising components a)-d)

According to a more preferred embodiment of the invention the polyethylene composition comprises bimodal high density polyethylene with a density in the range ≥940 and ≤970 kg/m³, which may for example be natural or coloured and a melt flow rate MFR190/5 in the range 0.1 and 4.0 g/10 min and a stabiliser package comprising:

a) ≥0.1 wt % and ≤0.2 wt % of tetrakis[methylene-3-(3', 5'-di-t-butyl-4-hydroxyphenyl)propionate] methane relative to the total amount of polyethylene and stabiliser package comprising components a)-d) and ≥0.3 wt % and ≤0.5 wt % of 1,3,5-trimethyl-2,4,6-tris(3,5-di-t-butyl-4-hydroxybenzyl)benzene relative to the total amount of polyethylene and stabiliser package comprising components a)-d)

b) ≥0.1 wt % and ≤0.2 wt % tris(2,4-di-tert-butylphenyl) phosphite relative to the total amount of polyethylene and stabiliser package comprising components a)-d)

c) ≥0.01 wt % and ≤0.05 wt % zinc sulphide relative to the total amount of polyethylene and stabiliser package comprising components a)-d)

d) ≥0.12 wt % and ≤0.3 wt % calcium stearate relative to the total amount of polyethylene and stabiliser package comprising components a)-d)

According to a more preferred embodiment of the invention the polyethylene composition comprises bimodal high density polyethylene with a density in the range ≥940 and ≤970 kg/m³, which may for example be natural or coloured and a melt flow rate MFR190/5 in the range ≥0.1 and ≤4.0 g/10 min and a stabiliser package comprising:

a) ≥0.12 wt % and ≤0.16 wt % of tetrakis[methylene-3-(3',5'-di-t-butyl-4-hydroxphenyl)propionate] methane relative to the total amount of polyethylene and stabiliser package comprising components a)-d)

and ≥0.3 wt % and ≤0.4 wt % of 1,3,5-trimethyl-2,4,6-tris(3,5-di-t-butyl-4-hydroxybenzyl)benzene relative to the total amount of polyethylene and stabiliser package comprising components a)-d)

b) ≥0.1 wt % and ≤0.2 wt % tris(2,4-di-tert-butylphenyl) phosphite relative to the total amount of polyethylene and stabiliser package comprising components a)-d)

c) ≥0.03 wt % and ≤0.05 wt % zinc sulphide relative to the total amount of polyethylene and stabiliser package comprising components a)-d)

d) ≥0.16 wt % and ≤0.25 wt % calcium stearate relative to the total amount of polyethylene and stabiliser package comprising components a)-d)

The polyethylene composition according to the invention can be applied in the production of articles, which are used in applications where a high temperature resistance is needed. This means applications with constant temperatures between 40-60° C. or temperature peaks up to 80° C.

Typical articles are, heat exchangers, power cable conduits, undersea cables, tanks, geo-membranes and pipes for example large diameter pressure pipes.

According to a preferred embodiment of the invention the article is produced with a composition comprising or consisting of multimodal polyethylene and
- a) polyphenolic stabiliser or mixtures thereof
- b) organic phosphite and/or phosphonite or mixtures thereof
- c) zinc sulphide and
- d) acid scavenger The pipe may be a pressure pipe or a non-pressure pipe. The preferred pipe is a pressure pipe. The resin according to the invention complies preferably with ISO 4427, "Plastics piping systems-Polyethylene (PE) pipes and fittings for water supply" and ISO 4437, "Plastics piping systems for the supply of gaseous fuels" for PE100 qualification. Suitable examples include for example large diameter pipes in power plants, hot fluid transport, biogas storage, geo-thermal applications, swagelining and sub-sea risers.

According to a preferred embodiment of the invention a pipe is produced with a composition comprising or consisting of multimodal polyethylene and
- a) polyphenolic stabilisers or mixtures thereof
- b) organic phosphite and/or phosphonite
- c) zinc sulphide and
- d) acid scavenger.

The multimodal ethylene grades to be applied in pipe applications may comprise additives such as for example carbon black, pigments, stearates, a UV stabilizer for example a sterically hindered amine, fillers, minerals, lubricants and/or other stabilisers.

Preferably the components of the stabilizer package according to the present invention are added during the granulation step of the multimodal, for example bimodal, high density polyethylene powder.

According to a further preferred embodiment of the invention the components are added to the polyethylene resin while the polyethylene is in a molten state during extrusion.

The components may be added together and may be added separately.

Preferably the components are added in one step.

The invention will be elucidated by means of the following non-limiting examples.

EXAMPLES

The resin A used as base polymer in all examples was a bimodal high density polyethylene with melt flow rate MFR190/5 of 0.29 g/10 min and density of 948 kg/m$^3$. All compositions contained 2.1 wt % carbon black.

Examples I-II and Comparative Examples A-C

The Example I and Comparative Examples A, B use different additive packages to protect the polyethylene from thermo-oxidative degradation. The compounds as indicated in Table 1 were compounded on a Coperion NT Extruder. The extruder consists of a two-stage compounding system. In the first stage, the plasticizing of the polymer powder is done by means of a smaller, high-speed twin-screw compounder. In the second stage, the melt is homogenized at a slower speed and a high degree of fill on a larger twin screw extruder. Separating the plasticizing from the homogenization into two stages allows the use of screw configurations and process parameters that are optimum for bimodal HDPE.

The set-up consisted of a ZSK 26 and ZSK 40 in series. The process data are summarized in Table 1.

TABLE 1

Summary of the process data.

| Extruder Feed | |
|---|---|
| Total feed rate | 37.0 kg/h |
| Feeder 1 - base grade powder | 34.41 kg/h |
| Feeder 2 - pre-mix of additives, carbon black and base grade powder | 2.59 kg/h |

| ZSK 26 | |
|---|---|
| Screw speed | 430/min |
| Torque | 70-72% |
| SEI-VT | 0.181-0.186 kWh/kg |
| Throttle valve | 40° |
| pm 8-0 | 58-65 bar |

| ZSK 40 | |
|---|---|
| Screw speed | 97/min |
| Torque | 68-71% |
| SEI-VT | 0.121-0.127 kWh/kg |
| pm 8-0 | 160-170 bar |

The feeders were placed at the forth of the seven barrels of the SKZ26. The barrels were heated to the set points given in Table 2.

TABLE 2

Set-point of barrel temperatures.

| | ZSK26 | | ZSK40 | |
|---|---|---|---|---|
| T 1 | Barrel 1 | | Barrel 1 | |
| T 2 | Barrel 2 | | Barrel 2 | |
| T 3 | Barrel 3 | | Barrel 3 | 230° C. |
| T 4 | Barrel 4 | 40° C. | Barrel 4 | 250° C. |
| T 5 | Barrel 5 | 100° C. | Barrel 5 | 260° C. |
| T 6 | Barrel 6 | 160° C. | Barrel 6 | 260° C. |
| T 7 | Barrel 7 | 190° C. | Barrel 7 | 270° C. |
| T 8 | Throttle | 230° C. | Barrel 8 | 290° C. |
| T 9 | Transition | 230° C. | 8-0 h | 230° C. |

All samples were prepared at the same conditions. The wt % are based on the total amount of stabilisers, carbon black and polyethylene. The compositions are given in Table 3.

TABLE 3

Compostion of Compounds.

| Ingredients in wt % | Sample A | Sample B | Sample I |
|---|---|---|---|
| Irganox 1010 | 0.2 | 0.13 | 0.15 |
| Irganox 1330 | 0 | 0.35 | 0.35 |
| ZnS | 0 | 0 | 0.05 |
| Irgafos 168 | 0.1 | 0.14 | 0.14 |
| CaSt | 0.2 | 0.2 | 0.2 | wherein:

Irganox 1010: Tetrakis [methylen-3-(3',5')-di-t-butyl-4'-hydroxyphenyl) propionate] methane commercially available from BASF.

Irganox 1330: 1,3,5-Trimethyl-2,4,6-tris(3,5-di-tert-butyl-4-hydroxybenzyl)benzene; commercially available from BASF.

ZnS: Zinc sulphide, commercially available from Qolor Tech.

Irgafos 168: Tris(2,4-di-tert-butylphenyl) phosphite; commercially available from BASF.

CaSt: Calcium stearate, commercially available from Faci.

1. Sample Preparation

The aging test was performed on compression molded plaques. The granules were compression molded according to DIN EN ISO 293-2, DIN EN ISO 1872 2 and DIN EN ISO 1873-3. The sample plaques had a size of 190×150×2 mm, respectively 170×170×2 mm. A press from Collin, type 200P was used. The compression molding was done at 180° C. with 5 min compression time (1 min at 10 bar, 2 min at 30 bar, 2 min at 40 bar). The plaques were cooled down to 30° C. with a cooling rate of 4 sec/° C. at a pressure of 50 bar.

2. Aging Test

Test a)

The sample plaques were immersed in a glass container filled with demineralized water. For each compound a separate glass container was used. To ensure complete coverage with water, samples were mounted on a steel wire, separated by a spacer. The glass containers were kept at 80° C. in an air-circulated oven from Binder. The oven temperature was controlled and recorded electronically by Aspen Process Explorer. The water was changed every 500 hours.

Sample Characterisation

Oxidation Induction Time (OIT)

The OIT measurements were done according to ISO11357-6. The samples were heated to 200° C. under nitrogen, after three minutes the atmosphere was switched from nitrogen to oxygen. All measurements were done in duplicate. The average of two independent measurements is reported in Table 4.

In Table 4 the OIT results are shown as relative values in % comparison to the unaged sample. The value was calculated according to the following formula Rel. OIT %=(OIT of aged specimen [min]/OIT of unaged specimen [min])·100

TABLE 4

Relative OIT values in comparison to unaged samples.

| Aging Time [h] | Sample A Rel. OIT [%] | Sample B Rel. OIT [%] | Sample I Rel. OIT [%] |
|---|---|---|---|
| 0 | 100 | 100 | 100 |
| 2500 | 15 | 45 | 61 |
| 5000 | 6 | 21 | 50 |
| 7500 | — | 15 | 41 |

Table 4 shows that Example I demonstrates significantly less reduction of the OIT after being exposed to hot water Comparative Example A and B.

Comparing Comparative Example A and B to Example I shows that the effect of adding zinc sulfide in combination with a phenolic antioxidant had an additional effect on the OIT value as obtained after exposure to hot water.

Test b)

Autoclave Test

The autoclave test was developed to assess the oxidative long-term durability of geotextiles and related products. The method is established as a screening test in European standards (DIN EN ISO 13438, method C).

The acceleration of the thermo-oxidative aging process was carried out at an elevated temperature of 80° C. and 50 bar oxygen pressure. The autoclave was filled by 80 with demineralized water. The specimens were placed in an appropriate sample holder. Compression molded sample plaques with a size of 100×150 mm were tested. During the whole test the samples were completely covered by water. The water was permanently stirred to ensure a good mixing of solvent and solutes. Oxygen pressure and temperature were applied with a precision of 0.5 bar and 0.5° C. Both was monitored at least every 15 minutes. To avoid cross-contamination, each compound was tested in a separate autoclave.

The plaques were removed after a certain period of time for mechanical evaluation by tensile testing. This was done according to DIN EN ISO 527-2. Tensile bars type 5A are punched out of the plaques. The unaged, control specimens were stored for 24 hours in water at 80° C. The results are shown in Table 5.

TABLE 5

Results of tensile test before and after ageing.

| | Aging time [d] | Stress at break [MPa] | % | Elongation at break [%] | % |
|---|---|---|---|---|---|
| Sample A | 1 | 37.3 | 100 | 497.8 | 100 |
| | 39 | 5.2 | 14 | 64 | 12.9 |
| | 50 | to brittle for measurement | | | |
| Sample B | 1 | 39.6 | 100 | 535.7 | 100 |
| | 54 | 28.9 | 73.1 | 492.5 | 91.9 |
| | 64 | 12.6 | 31.7 | 278.3 | 52 |
| | 88 | to brittle for measurement | | | |
| Sample I | 1 | 36.9 | 100 | 535.7 | 100 |
| | 53 | 36.4 | 91.9 | 542.2 | 101.2 |
| | 77 | 13.6 | 34.3 | 313.2 | 58.5 |

The invention claimed is:

1. A polyethylene composition comprising polyethylene and a stabiliser package comprising:
   a) a phenolic stabiliser or mixtures thereof,
   b) an organic phosphite, phosphonite or mixtures thereof,
   c) zinc sulphide, and
   d) an acid scavenger,
   wherein the amount of zinc sulphide is ≥0.01 wt % and ≤0.09 wt % relative to the total amount of polyethylene and stabiliser package comprising components a)-d).

2. The polyethylene composition according to claim 1 comprising bimodal polyethylene and a stabiliser package comprising:
   a) ≥0.1 wt % and ≤0.6 wt % of the phenolic stabiliser or mixtures thereof relative to the total amount of polyethylene and stabiliser package comprising components a)-d),
   b) ≥0.1 wt % and ≤0.3 wt % of the organic phosphite, the phosphonite or mixtures thereof relative to the total amount of polyethylene and stabiliser package comprising components a)-d),
   c) ≥0.01 wt % and ≤0.09 wt % zinc sulphide relative to the total amount of polyethylene and stabiliser package comprising components a)-d), and
   d) ≥0.1 wt % and ≤0.3 wt % of the acid scavenger relative to the total amount of polyethylene and stabiliser package comprising components a)-d).

3. The polyethylene composition according to claim 1 comprising bimodal polyethylene and a stabiliser package comprising:
   a) ≥0.4 wt % and ≤0.6 wt % of the phenolic stabiliser or a mixture thereof relative to the total amount of polyethylene and stabiliser package comprising components a)-d),
   b) ≥0.1 wt % and ≤0.2 wt % of the organic phosphite, the phosphonite or mixtures thereof relative to the total amount of polyethylene and stabiliser package comprising components a)-d), c) ≥0.01 wt % and ≤0.05 wt % zinc sulphide relative to the total amount of polyethylene and stabiliser package comprising components a)-d), and d) ≥0.1 wt % and ≤0.3 wt % of the acid scavenger relative to the total amount of polyethylene and stabiliser package comprising components a)-d).

4. The polyethylene composition according to claim 1, wherein the polyethylene is a multimodal high density polyethylene (HDPE) having a polymer density ≥940 and ≤965 kg/m$^3$, a melt flow rate 190/5 in the range ≥0.1 and ≤4.0 g/10 min, or a combination thereof, wherein the density is measured according to ISO 1183 A and the melt flow rate MFR 190/5 is measured according to ISO 1133-1(190° C.; 5.0 kg).

5. The polyethylene composition according to claim 1, wherein the polyethylene component has a carbon black content in the range ≥1.5 wt % and ≤3.0 wt % relative to the total amount of the composition.

6. The polyethylene composition according to claim 1, wherein the phenolic stabiliser is selected from tetrakis[methylene-3-(3',5'-di-t-butyl-4-hydroxyphenyl)propionate] methane, 1,1,3-tris(2-methyl-4-hydroxy-5-t-butylphenyl) butane; 1,3,5-trimethyl-2,4,6-tris(3,5-di-t-butyl-4-hydroxybenzyl)benzene, bis(3,3-bis(4'-hydroxy-3'-t-butylphenyl) butanoic acid]-glycol ester, tris(3,5-di-t-butyl-4-hydroxy benzyl)isocyanurate, 1,3,5-tris(4-t-butyl-2,6-dimethyl-3-hydroxy-benzyl)isocyanurate, 3,5-di-t-butyl-4-hydroxy-hydrocinnamic acid triester of 1,3,5-tris(2-hydroxyethyl)-s-triazine-2,4,6(1H, 3H, 5H)-trione, p-cresol/dicyclopentadiene butylated reaction product, 2,6-bis(2'-bishydroxy-3'-t-butyl-5'-methyl-phenyl-4-methyl-phenol, or a combination thereof.

7. The polyethylene composition according to claim 1, wherein the organic phosphite or phosphonite is selected from triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphate, bis(2,6-di-tert-butyl-4-methylphenyl) pentaerythritol diphosphate, bisisodecyloxypentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, or a combination thereof.

8. The polyethylene composition according to claim 1, wherein the acid scavenger is selected from calcium stearate, magnesium stearate, calcium lactate, hydrotalcite, zinc oxide, or a combination thereof.

9. The polyethylene composition according to claim 1, wherein the polyethylene composition comprises polyethylene and a stabiliser package comprising:

a) the phenolic stabilisers tetrakis[methylene-3-(3',5'-di-t-butyl-4-hydroxyphenyl)propionate] methane, 1,3,5-trimethyl-2,4,6-tris(3,5-di-t-butyl-4-hydroxybenzyl) benzene, or a mixture thereof, b) organic phosphite tris(2,4-di-tert-butylphenyl)-phosphite, c) zinc sulphide, and d) the acid scavenger calcium stearate.

10. The polyethylene composition according to claim 1, wherein the total amount of the stabiliser package in the composition is ≥0.7 wt % and ≤3.0 wt % relative to the total amount of polyethylene and stabiliser package comprising components a)-d).

11. The polyethylene composition according to claim 1, wherein the total amount of the stabiliser package in the composition is ≥0.7 wt % and ≤1.5 wt % relative to the total amount of polyethylene and stabiliser package comprising components a)-d).

12. The polyethylene composition according to claim 1, wherein the polyethylene is HDPE with a pigment, and has the following characteristics, Tensile modulus between ≥900 and ≤1400 MPa (according to ISO 527-2),
Yield stress between ≥22 and ≤32 MPa (according to ISO 527-2),
Full Notch Creep Test (FNCT) between 1000-20000 h (according to ISO 16770 @80° C./4 MPa) and
Charpy between ≥17 and ≤35 kJ/m$^2$@23° C. (according to ISO 179-1eU).

13. The polyethylene composition according to claim 1, wherein the polyethylene composition comprises polyethylene and a stabiliser package comprising:

a) ≥0.1 wt % and ≤0.2 wt % of tetrakis[methylene-3-(3',5'-di-t-butyl-4-hydroxyphenyl)propionate] methane relative to the total amount of polyethylene and stabiliser package comprising components a)-d)
and ≥0.3 wt % and ≤0.5 wt % of 1,3,5-trimethyl-2,4,6-tris(3,5-di-t-butyl-4-hydroxybenzyl)benzene relative to the total amount of polyethylene and stabiliser package comprising components a)-d), b) ≥0.1 wt % and ≤0.2 wt % tris(2,4-di-tert-butylphenyl) phosphite and relative to the total amount of polyethylene and stabiliser package comprising components a)-d), c) ≥0.01 wt % and ≤0.05 wt % zinc sulphide relative to the total amount of polyethylene and stabiliser package comprising components a)-d), and d) ≥0.12 wt % and ≤0.3 wt % calcium stearate relative to the total amount of polyethylene and stabiliser package comprising components a)-d).

14. An article produced from a composition according to claim 1.

15. A pipe produced from a composition according to claim 1.

16. The polyethylene composition according to claim 1, comprising bimodal polyethylene and a stabiliser package consisting of:

a) ≥0.1 wt % and ≤0.6 wt % of the phenolic stabiliser or mixtures thereof relative to the total amount of polyethylene and stabiliser package comprising components a)-d), b) ≥0.1 wt % and ≤0.3 wt % of the organic phosphite, the phosphonite or mixtures thereof relative to the total amount of polyethylene and stabiliser package comprising components a)-d), c) ≥0.01 wt % and ≤0.09 wt % zinc sulphide relative to the total amount of polyethylene and stabiliser package comprising components a)-d), and d) ≥0.1 wt % and ≤0.3 wt % of the acid scavenger relative to the total amount of polyethylene and stabiliser package comprising components a)-d).

17. The polyethylene composition according to claim 1 comprising bimodal polyethylene and a stabiliser package consisting of:

a) ≥0.4 wt % and ≤0.6 wt % of the phenolic stabiliser or a mixture thereof relative to the total amount of polyethylene and stabiliser package comprising components a)-d),
b) ≥0.1 wt % and ≤0.2 wt % of the organic phosphite, or the phosphonite relative to the total amount of polyethylene and stabiliser package comprising components a)-d),
c) ≥0.01 wt % and ≤0.05 wt % zinc sulphide relative to the total amount of polyethylene and stabiliser package comprising components a)-d), and
d) ≥0.1 wt % and ≤0.3 wt % of the acid scavenger relative to the total amount of polyethylene and stabiliser package comprising components a)-d).

18. The polyethylene composition according to claim 1, wherein the polyethylene is a multimodal high density polyethylene (HDPE) having a polymer density ≥940 and ≤965 kg/m3 and a melt flow rate 190/5 in the range ≥0.1 and ≤4.0 g/10 min, wherein the density is measured according to ISO 1183 A and the melt flow rate MFR 190/5 is measured according to ISO 1133-1(190° C.; 5.0 kg);
wherein the polyethylene component has a carbon black content in the range ≥1.5 wt % and ≤3.0 wt % relative to the total amount of the composition,
wherein the phenolic stabiliser is selected from tetrakis [methylene-3-(3',5'-di-t-butyl-4-hydroxyphenyl)propionate] methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis(3,3-bis(4'-hydroxy-3'-t-butylphenyl)butanoic acid]-glycol ester, tris(3,5-di-t-butyl-4-hydroxy benzyl)isocyanurate, 1,3,5-tris(4-t-butyl-2,6-dimethyl-3-hydroxy-benzyl)isocyanurate, 3,5-di-t-butyl-4-hydroxy-hydrocinnamic acid triester of 1,3,5-tris(2-hydroxyethyl)-s-triazine-2, 4,6(1H, 3H, 5H)-trione, p-cresol/dicyclopentadiene butylated reaction product, 2,6-bis(2'-bis-hydroxy-3'-t-butyl-5'-methyl-phenyl-4-methyl-phenol, or a combination thereof,
wherein the organic phosphite or phosphonite is selected from triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphate, bis(2,6-di-tert-butyl-4-methylphenyl) pentaerythritol diphosphate, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, or a combination thereof,
wherein the acid scavenger is selected from calcium stearate, magnesium stearate, calcium lactate, hydrotalcite, zinc oxide, or a combination thereof, and
wherein the total amount of the stabiliser package in the composition is ≥0.7 wt % and ≤3.0 wt % relative to the total amount of polyethylene and stabiliser package comprising components a)-d).

19. A polyethylene composition comprising polyethylene and a stabiliser package comprising:
a) ≥0.1 wt % and ≤0.5 wt % of tetrakis[methylene-3-(3', 5'-di-t-butyl-4-hydroxyphenyl)propionate] methane relative to the total amount of polyethylene and stabiliser package comprising components a)-d) and ≥0.1 wt % and ≤0.5 wt % of 1,3,5-trimethyl-2,4,6-tris(3,5-di-t-butyl-4-hydroxybenzyl)benzene relative to the total amount of polyethylene and stabiliser package comprising components a)-d),
b) ≥0.1 wt % and ≤0.3 wt % tris(2,4-di-tert-butylphenyl) phosphite and relative to the total amount of polyethylene and stabiliser package comprising components a)-d),
c) ≥0.005 wt % and ≤0.3 wt % zinc sulphide relative to the total amount of polyethylene and stabiliser package comprising components a)-d), and
d) ≥0.12 wt % and ≤0.5 wt % calcium stearate relative to the total amount of polyethylene and stabiliser package comprising components a)-d).

* * * * *